US006493546B2

(12) United States Patent
Patsiokas

(10) Patent No.: US 6,493,546 B2
(45) Date of Patent: *Dec. 10, 2002

(54) SYSTEM FOR PROVIDING SIGNALS FROM AN AUXILIARY AUDIO SOURCE TO A RADIO RECEIVER USING A WIRELESS LINK

(75) Inventor: Stelios Patsiokas, Plantation, FL (US)

(73) Assignee: XM Satellite Radio Inc., Washington, DC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,207

(22) Filed: Mar. 5, 1999

(65) Prior Publication Data
US 2002/0058475 A1 May 16, 2002

(51) Int. Cl.[7] .................................. H04B 1/06
(52) U.S. Cl. ................. 455/277.1; 455/66; 455/345
(58) Field of Search .................... 455/12.1, 66, 74, 455/41, 39, 11.1, 344, 154.1, 3.04, 158.1, 3.02, 158.2, 277.1, 345, 67.1

(56) References Cited

U.S. PATENT DOCUMENTS

| 3,028,488 | A |   | 4/1962  | Hudspeth et al. ......... 250/15 |
| 3,546,386 | A |   | 12/1970 | Darcey et al. ............. 325/4 |
| 4,069,455 | A |   | 1/1978  | Sherman, Jr. ............ 325/469 |
| 4,130,801 | A |   | 12/1978 | Prygoff ...................... 325/4 |
| 4,507,646 | A |   | 3/1985  | Hamlin et al. ............ 340/310 |
| 4,734,897 | A |   | 3/1988  | Schotz ....................... 369/2 |
| 5,073,976 | A |   | 12/1991 | Kennedy ................... 455/161 |
| 5,161,251 | A | * | 11/1992 | Mankovitz ................. 455/66 |
| 5,214,787 | A |   | 5/1993  | Karkota, Jr. .............. 455/3.2 |
| 5,239,540 | A | * | 8/1993  | Rovira et al. .............. 370/77 |
| 5,319,716 | A | * | 6/1994  | McGreevy ................. 455/66 |
| 5,408,686 | A | * | 4/1995  | Mankovitz ................. 455/66 |
| 5,444,675 | A |   | 8/1995  | De Bie et al. ............... 369/2 |
| 5,448,757 | A | * | 9/1995  | Hirata ...................... 381/107 |
| 5,455,823 | A |   | 10/1995 | Noreen et al. ............. 370/50 |
| 5,490,284 | A |   | 2/1996  | Itoh et al. ................ 455/11.1 |
| 5,526,284 | A | * | 6/1996  | Mankovitz ............... 455/186.1 |
| 5,572,442 | A |   | 11/1996 | Schulhof et al. ........... 364/514 |
| 5,732,324 | A |   | 3/1998  | Rieger, III ................ 455/3.1 |
| 5,794,138 | A | * | 8/1998  | Briskman .................. 455/344 |
| 5,797,088 | A | * | 8/1998  | Staqmegna ................ 455/343 |
| 5,828,951 | A |   | 10/1998 | Suemitsu ................... 455/89 |
| 5,862,235 | A |   | 1/1999  | Kowalczyk ................ 381/79 |
| 5,867,794 | A | * | 2/1999  | Hayes et al. .............. 455/557 |
| 5,910,866 | A | * | 6/1999  | Shiomoto .................. 360/104 |
| 5,970,390 | A | * | 10/1999 | Koga et al. ................ 455/66 |
| 6,002,924 | A | * | 12/1999 | Takano ................... 455/161.1 |
| 6,023,616 | A | * | 2/2000  | Briskman .................. 455/344 |
| 6,052,603 | A | * | 4/2000  | Kinzalow et al. .......... 455/557 |
| 6,272,328 | B1 | * | 8/2001 | Nguyen et al. .......... 455/277.1 |

FOREIGN PATENT DOCUMENTS

EP 0949771 10/1999 ............ H04H/1/00

* cited by examiner

Primary Examiner—Edward F. Urban
Assistant Examiner—Tilahun Gesesse
(74) Attorney, Agent, or Firm—Roylance, Abrams, Berdo & Goodman, L.L.P.

(57) ABSTRACT

An apparatus and method are provided for transmitting audio signals from an auxiliary source such as a satellite broadcast receiver or a CD or cassette player to a radio receiver located, for example, in a vehicle, using a wireless link. The apparatus comprises a scanning device for locating open radio frequencies in the RF spectrum of the radio receiver. The apparatus displays plural RF channel options on a display device and provides a selection device with which a user selects an RF channel. The apparatus modulates the audio signals using the selected radio frequency, and the user tunes the vehicle radio receiver to the selected RF channel. The scanning device continuously scans for open RF channels and monitors the quality of the RF channel already selected for use as the wireless link. The apparatus provides the user with an indication to select another open channel when the RF channel in use degrades.

9 Claims, 6 Drawing Sheets

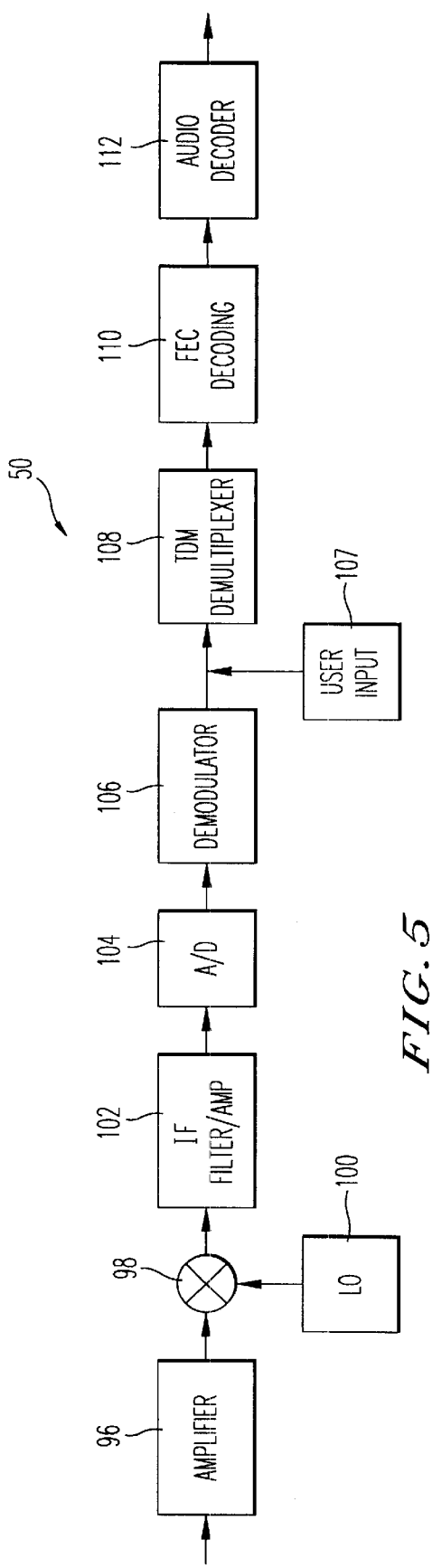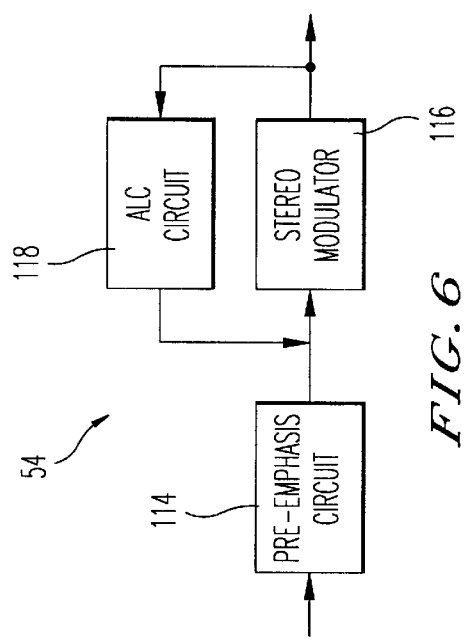

SYSTEM FOR PROVIDING SIGNALS FROM AN AUXILIARY AUDIO SOURCE TO A RADIO RECEIVER USING A WIRELESS LINK

FIELD OF THE INVENTION

The invention relates to a system for providing audio signals from an auxiliary source to a radio receiver, particularly a vehicle radio receiver, using a wireless link. The invention further relates to a method of providing audio signals to a radio receiver by automatically selecting a number of low noise radio frequencies for wireless signal transmission from the auxiliary source to the radio receiver and providing user controls to select one of the frequencies for transmission.

BACKGROUND OF THE INVENTION

A number of systems exist which use an existing audio system in a vehicle for playback of audio signals from a compact disc (CD) player, tape cassette player, satellite broadcast receiver, or other auxiliary audio source. These existing systems are designed to play back the signals from the auxiliary audio source using a number of different methods. For example, one system receives satellite broadcast signals and provides them to the optical head of a CD player, or the magnetic head of a tape cassette player, already installed in the vehicle. This system is disadvantageous because it requires the user to install a removable adapter to couple the satellite broadcast signal to the optical or magnetic head of the vehicle audio system.

In other systems, signals from an auxiliary audio source such as a CD or cassette player are coupled to a vehicle radio receiver via a wireless link such as an FM wireless link. In one system, for example, signals from the auxiliary audio source are frequency translated to the FM frequency band and are then broadcast from a transmitter in the vehicle on several fixed frequencies for reception by the vehicle radio receiver. A user then selects one of these frequencies on the vehicle radio receiver to listen to the transmitted signals. In another system, a user first selects a radio frequency in the FM band that is not being utilized in the local area, and then tunes the existing vehicle radio receiver to the selected frequency. The user then tunes a transmitter in the vehicle to the same frequency. The transmitter receives a signal from a CD player and transmits the signal at the selected frequency.

The two types of wireless FM systems described above are disadvantageous because they do not provide for automatic monitoring of the radio frequencies used for retransmitting signals from the auxiliary audio source via the wireless link to the existing vehicle radio receiver. The radio frequencies selected by the user, or the fixed frequencies used by the transmitter, may be subject to interference and poor signal quality. In addition, the manual selection of a suitable radio transmission frequency is inconvenient to users.

A need therefore exists for an audio coupling system that overcomes the aforementioned drawbacks of the existing systems. Specifically, a need exists for a radio frequency or RF-coupled satellite broadcast receiver for vehicles which provides a wireless link to an existing vehicle radio receiver. In addition, a need exists for an RF-coupled satellite broadcast receiver for vehicles which automatically selects optimal radio frequencies for wireless transmission to the vehicle radio receiver.

SUMMARY OF THE INVENTION

In accordance with one aspect of the present invention, an RF-coupled satellite broadcast receiver is provided which scans a radio frequency (RF) band in which a radio receiver, preferably but not necessarily in a vehicle, can be tuned for signal reception. The RF-coupled satellite broadcast receiver selects at least one open RF channel having the lowest noise floor for retransmission of the received satellite broadcast signal to the radio receiver.

In accordance with another aspect of the present invention, the RF-coupled satellite broadcast receiver selects a plurality of open RF channels having low noise floors and is capable of retransmitting the received satellite broadcast signal on any of these available RF channels. The available RF channel information is provided to the user. The user selects one of these channels and then tunes the vehicle radio receiver to the selected channel to listen to the satellite broadcast program.

BRIEF DESCRIPTION OF DRAWINGS

The various aspects, advantages and novel features of the present invention will be more readily comprehended from the following detailed description when read in conjunction with the appended drawings, in which:

FIG. 5 is a block diagram of a satellite broadcast receiver for use with the system depicted in FIG. 1 in accordance with an embodiment of the present invention;

FIG. 6. is a block diagram of a level control and de-emphasis circuit for use with the system depicted in FIG. 1 in accordance with an embodiment of the present invention;

Throughout the drawing figures, like reference numerals will be understood to refer to like parts and components.

DETAILED DESCRIPTION OF THE PREFERRED EMBODIMENTS

Figure 1:
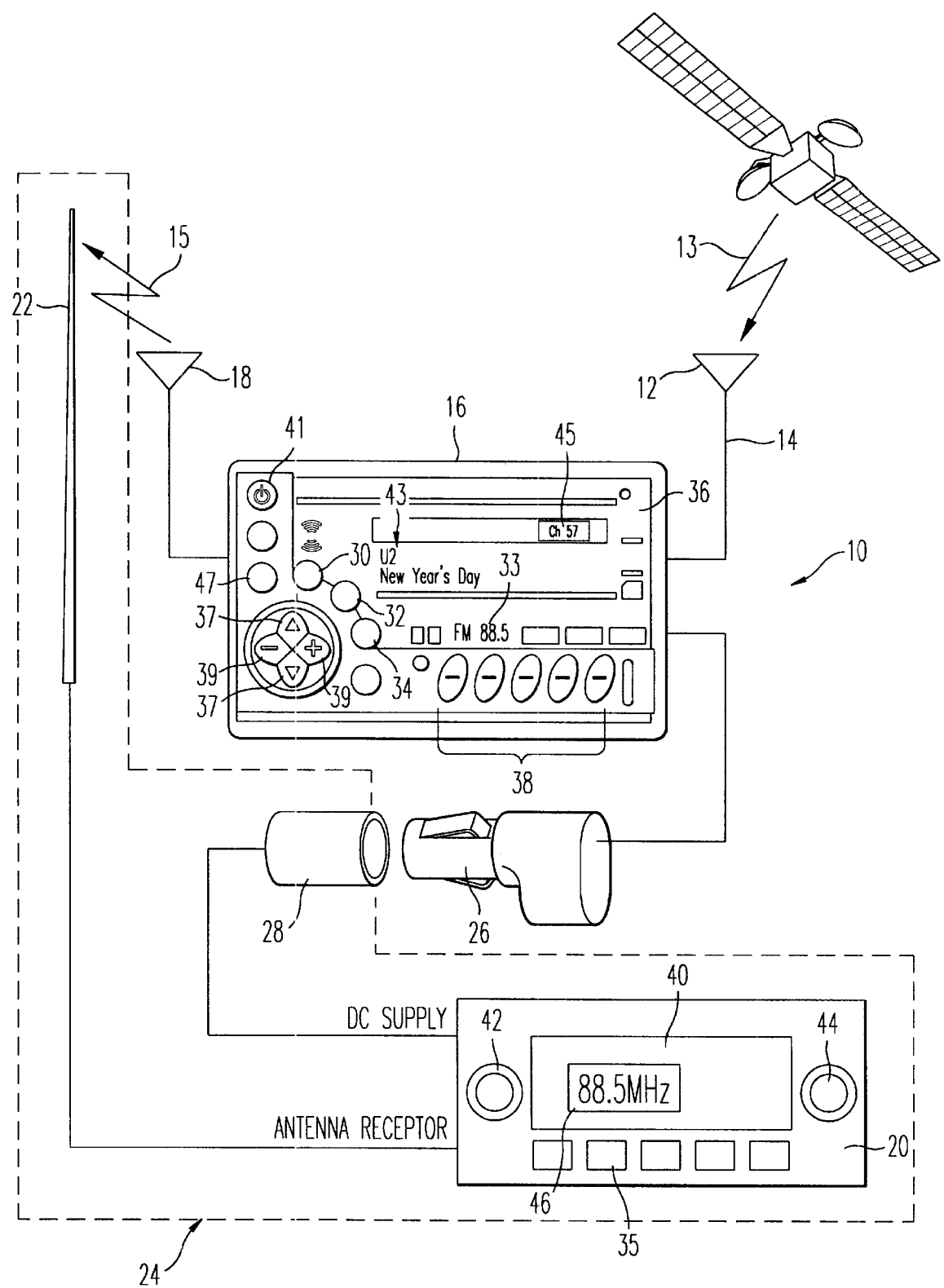
FIG. 1 is a block diagram of an auxiliary audio system constructed in accordance with an embodiment of the present invention to provide audio signals to an existing radio via a wireless link.

A system 10 for providing satellite broadcast signals 13 or audio signals from another auxiliary audio source to an existing radio receiver 24 (e.g., in a vehicle) using a wireless link 15 in accordance with the present invention is depicted in FIG. 1. The system 10 comprises an antenna 12 such as a satellite S-band antenna (operable at about 2.3 Gigahertz) for receiving satellite broadcast signals. The antenna 12 is connected via a coaxial cable 14, for example, to an auxiliary audio signal processing and display device 16, which is hereinafter referred to as the interface device 16. Another antenna 18 is connected to the interface device 16 to transmit signals therefrom to a radio receiver 24 comprising a tuner 20 and an antenna 22.

Figure 2:
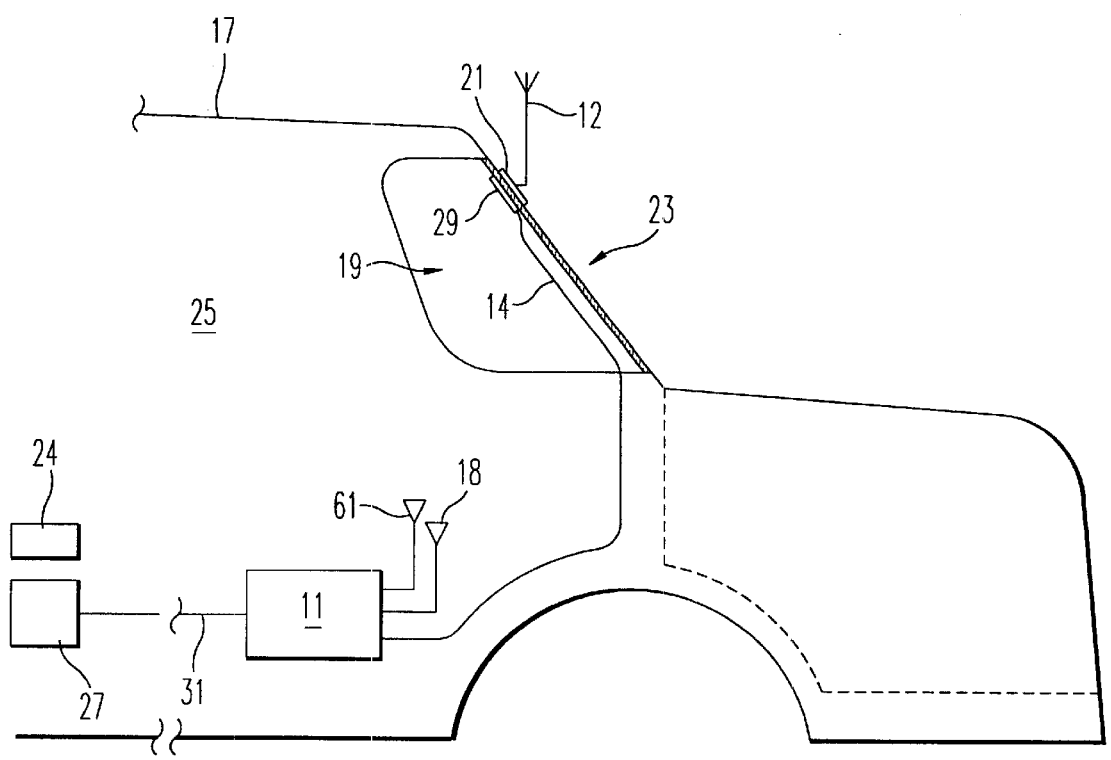
FIG. 2 illustrates the installation of the system depicted in FIG. 1 in a vehicle in accordance with an embodiment of the present invention.

The antenna 12 and its associated circuitry (e.g., a low noise amplifier) can be connected internally or externally with respect to a vehicle. The antenna 12 can be used to receive satellite digital audio radio service (SDARS), a satellite broadcast service recently established by the U.S. Federal Communications Commission (FCC), in a vehicle. As shown in FIG. 2, the antenna 12 can be mounted on the roof 17 or rear window 19 of a vehicle 23, for example. The cable 14 connects the antenna 12 to a remote unit 11 forming a part of the interface unit 16 of FIG. 1. The remote unit 11 can comprise, for example, an SDARS receiver. The remote unit 11 can be placed in the cab 25 of a car or truck, for example. To avoid having to drill a hole in the truck or car 23 to install the cable 14, a device 21 can be mounted on the exterior of the vehicle's rear window 19 using an adhesive material which supports the antenna 12 and associated circuitry. The device 21 can be capacitvely coupled with another device 29 which is connected to the cable 14. The other device 29 can be mounted on the inside of the window 19 opposite the first device 21 using the same adhesive material. The remote unit 11 is connected to a display and control unit 27, also forming a part of the interface device 16 of FIGS. 1 and 8, via a wireline 31 or wireless link to the dashboard or other location in view of the driver. The display and control unit 27 can comprise the scanning receiver, the RF modulation and transmission devices and the display and control devices. In accordance with an embodiment of the present invention, the channels of the SDARS receiver can be changed remotely using the display and control unit 27. Alternatively, the interface device 16 can be installed as a single unit on or near the dashboard and therefore accessible to the driver of the vehicle 23. As described below and illustrated in FIGS. 1 and 8, the interface device 16 (or, in the two-part installation shown in FIG. 2, the display and control unit 27) comprises a display 36 for indicating one or more RF channels to which the user can tune the radio receiver 24 to complete the wireless link 15. The display and control unit 27 can also be provided with channel selection buttons 38, which are described below.

As shown in FIG. 1, the system 10 of the present invention comprises a DC power supply adapter 26 which can be inserted in the cigarette lighter socket 28 provided in the dashboard of most vehicles to provide power to the system 10. The interface unit 16 can also be configured as a portable device which can be disconnected from the vehicle and operated from an AC outlet (using a suitable AC/DC converter) or from batteries. Thus, the interface device 16 can be used inside a home, for example, or in conjunction with a portable radio.

With continued reference to FIG. 1, the radio receiver 24 is preferably a conventional amplitude modulation (AM) and frequency modulation (FM) radio provided as standard equipment in many vehicles. The antenna 22 is configured to receive AM and/or FM signals. In accordance with the present invention, the radio receiver 24 need not be modified in any way to output the audio programming provided by the satellite broadcast signals or by another auxiliary audio source. The antenna 18 is preferably an FM antenna, and the interface 16 device is operable to convert the satellite broadcast signals received via the antenna 12 to FM-band signals for retransmission from the antenna 18 to the radio receiver 24. Thus, the system 10 of the present invention operates with existing radios. It is to be understood, however, that the present invention can be configured to operate with other types of receivers using wireless links at radio frequencies other than the AM and FM bands.

The interface device 16 preferably comprises a display 36 for indicating one or more radio frequencies that are selected by the interface device for providing the wireless link 15. In the example illustrated in FIGS. 1 and 8, the interface device 16 has determined that the radio frequencies of 88.5 Megahertz (MHz), 98.7 MHz and 103.5 MHz are relatively low noise, open channels which can be used for the wireless link 15. The user can select one of these channels (e.g., 88.5 MHz) for transmission by the interface device 16 by selecting one of the corresponding buttons 30, 32 and 34 provided on the interface device 16. The buttons 30, 32 and 34 can be implemented as touch screen buttons, for example. The user then selects the same frequency (88.5 MHz in the present example) on the vehicle tuner 20 using a tuning dial 42 or one of a number of preset buttons 35 provided on the radio receiver 24 for selecting a radio station. The selected radio channel (e.g., 88.5 MHz) is indicated on the tuner display 46 in a conventional manner. The tuner 20 can also be a chassis with a tuner and a tape cassette player as indicated by the cassette slot 40. A CD player can be provided in lieu of, or in addition to, the cassette player. A volume control dial 44 is provided in a conventional manner.

Figure 3:
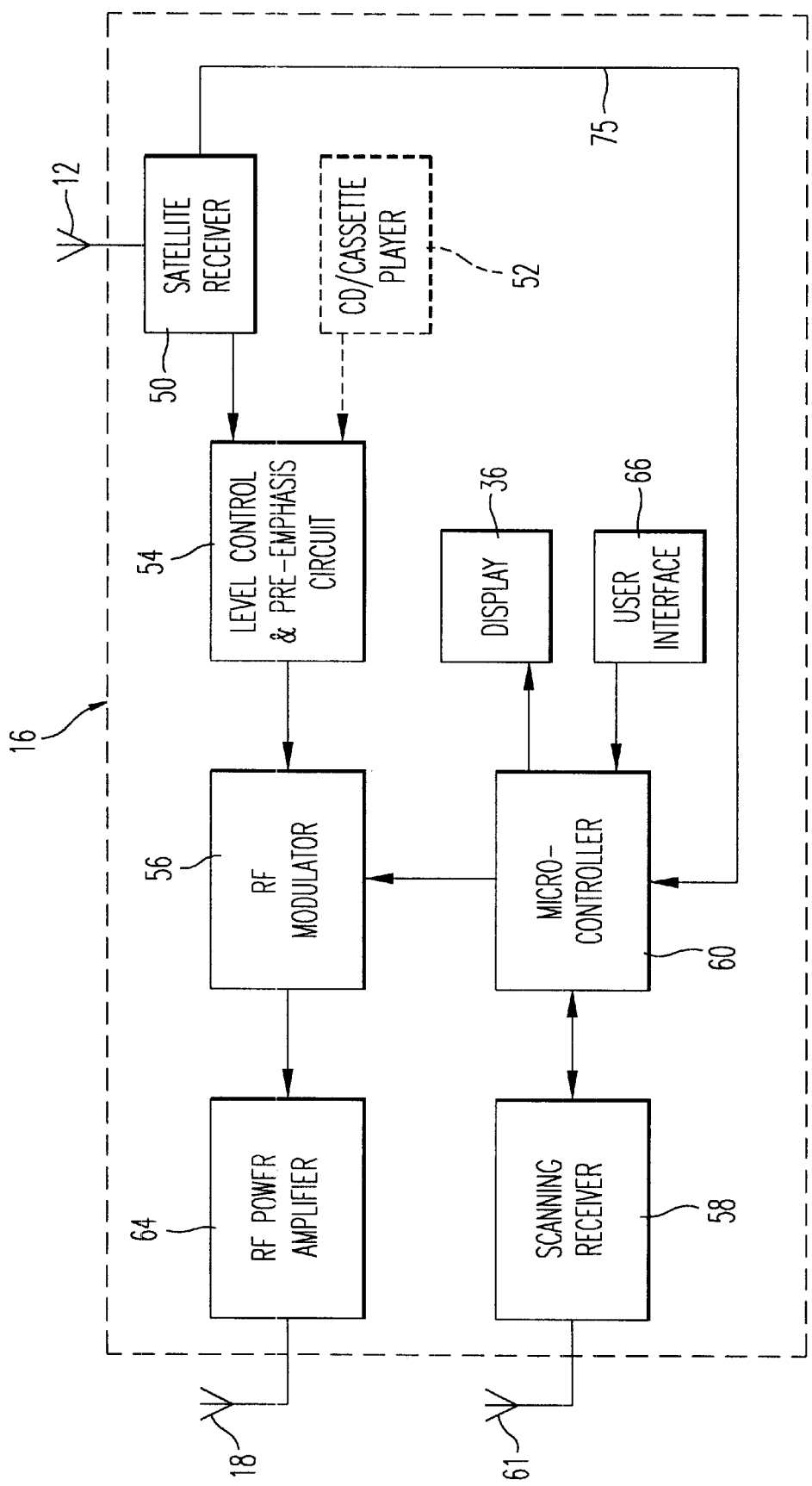
FIG. 3 is a block diagram of an interface circuit constructed in accordance with an embodiment of the present invention.

The interface device 16 will now be described in more detail with reference to FIG. 3. As shown in FIG. 3, the interface device 16 includes an auxiliary audio source such as an S-band satellite receiver 50. The satellite receiver 50 can also be operated in other RF bands and have, for example, an L-band or UHF front-end for use with direct audio broadcast (DAB) systems in different countries. The auxiliary audio source can also be a CD or cassette player 52 or other device, and can be located external to the interface device 16 via an external source input if desired. The satellite receiver 50, described below in connection with FIG. 5, preferably downconverts and processes the received satellite broadcast signal to obtain a baseband signal. Alternatively, the satellite receiver 50 can downconvert the satellite broadcast signal to an intermediate frequency (IF). The output signal from the satellite receiver is processed via a level control and pre-emphasis circuit 54, which is described below in connection with FIG. 6. The level control and pre-emphasis circuit 54 provides a composite stereo signal to an RF modulator 56.

In accordance with the present invention, the RF modulator 56 converts the composite signal to a radio frequency selected using a scanning receiver 58. The scanning receiver 58 preferably continuously monitors the RF spectrum of the geographic area in which the vehicle is located via an antenna 61 for open RF channels (i.e., RF channels that have no transmitted broadcast signals). The scanning receiver 58 also determines which of the open frequencies satisfy predetermined criteria for low noise (e.g., comparatively small signal strength). In other words, the scanning receiver 58 locates RF channels having a signal-to-noise ratio (SNR) below a predetermined level (e.g., below about 5 decibels). These RF channels are generally not used by broadcast stations in a particular geographic area and do not exhibit the hissing or muting often associated with a weak broadcast signal that is unacceptable to a listener. When an RF channel is located which meets these criteria, the scanning receiver 58 provides the radio frequency to a microcontroller 60. The microcontroller 60 is programmed to display at least one, and preferably several, radio frequencies on the display 36 which represent possible low noise, open channels for the wireless link 15. The microprocessor 60 is also programmed to provide a user with a user interface 66 with which to select one of the possible open channels (e.g., buttons 30, 32 and 34). For example, the microcontroller 60 can implement the three buttons 30, 32 and 34 as a touch screen interface in conjunction with the display 36 for selecting any of three open channels (i.e., 88.5 MHz, 98.7 MHz or 103.5 MHz in the example shown in FIG. 1). Other aspects of the display 36 which represent advantages of a satellite receiver are described below with reference to FIG. 8.

After the user selects one of the channel options provided by the scanning receiver 58 for the wireless link 15, the microcontroller 60 provides an output signal to the RF modulator to modulate the baseband or IF signal from the level control and pre-emphasis circuit 54 using frequency mixing. Accordingly, the audio signal from the auxiliary audio source 50 or 52 is modulated onto the selected RF channel for transmission via the wireless link 15, following amplification by an RF power amplifier 64.

The starting point of the scanning receiver 58, that is, the first RF channel of the algorithm controlling the scanning receiver 58, is selected automatically and randomly to avoid all receivers selecting the same unused channels in a particular geographic area and to minimize vehicle-to-vehicle interference. It is to be understood that the RF channel need not be in the FM radio broadcast spectrum. For example, the wireless link 15 can be implemented in the AM radio broadcast spectrum. In that case, the scanning receiver 58 and the RF modulator are operated using AM radio broadcast frequencies. The scanning receiver 58 preferably commences scanning upon power-up of the interface device 16. The interface unit 16 also comprises a scan button 70, as shown in FIGS. 1 and 8, which allows a user to manually initiate scanning via the scanning receiver 58.

Figure 7:
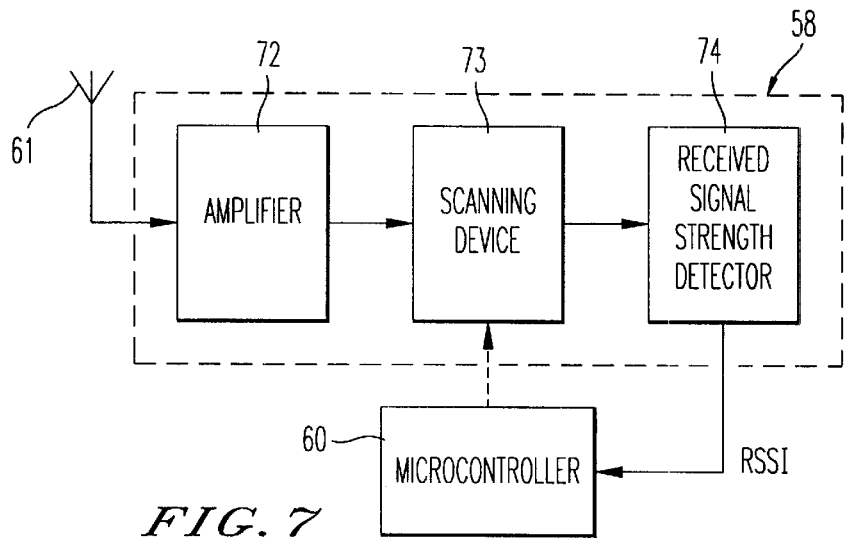
FIG. 7 illustrates a scanning receiver constructed in accordance with an embodiment of the present invention.

An exemplary scanning receiver 58 is depicted in FIG. 7. The scanning receiver 58 comprises an amplifier 72 to amplify the signals received via the antenna 61. A scanning device 73 can be provided with an input to receive signals from the microcontroller 60. When the scan button 70 is activated by a user or the interface device 16 is turned on (i.e., via button 41), the microcontroller 60 responds by sending a signal to the scanning receiver 58 to initiate the scanning algorithm for the scanning device 73. The scanning device 73 is preferably programmed to scan every 200 kHz for operation in conjunction with an FM broadcast transmission system in the United States. The scanning device 73 can be programmed to operate in accordance with different channel spacing allocations and radio frequency broadcast bands in other countries so as to scan every 100 kHz of the FM broadcast band in Europe, for example. The scanning device 73 is connected to a received signal strength detector 74 which provides a received signal strength indicator (RSSI) to the microcontroller 60. The microcontroller 60 determines if any of the scanned frequencies meet the pre-defined criteria for the wireless link is described previously. Weak channels are detected as low voltage signals, whereas strong signals are detected at higher voltage signals. The microcontroller 60 preferably selects the three lowest energy or weak channels having the lowest voltages measured by the detector 74. Selected scanned frequencies which meet the pre-defined criteria are indicated on the display, as shown in FIGS. 1 and 8, by the microcontroller 60.

Figure 8:
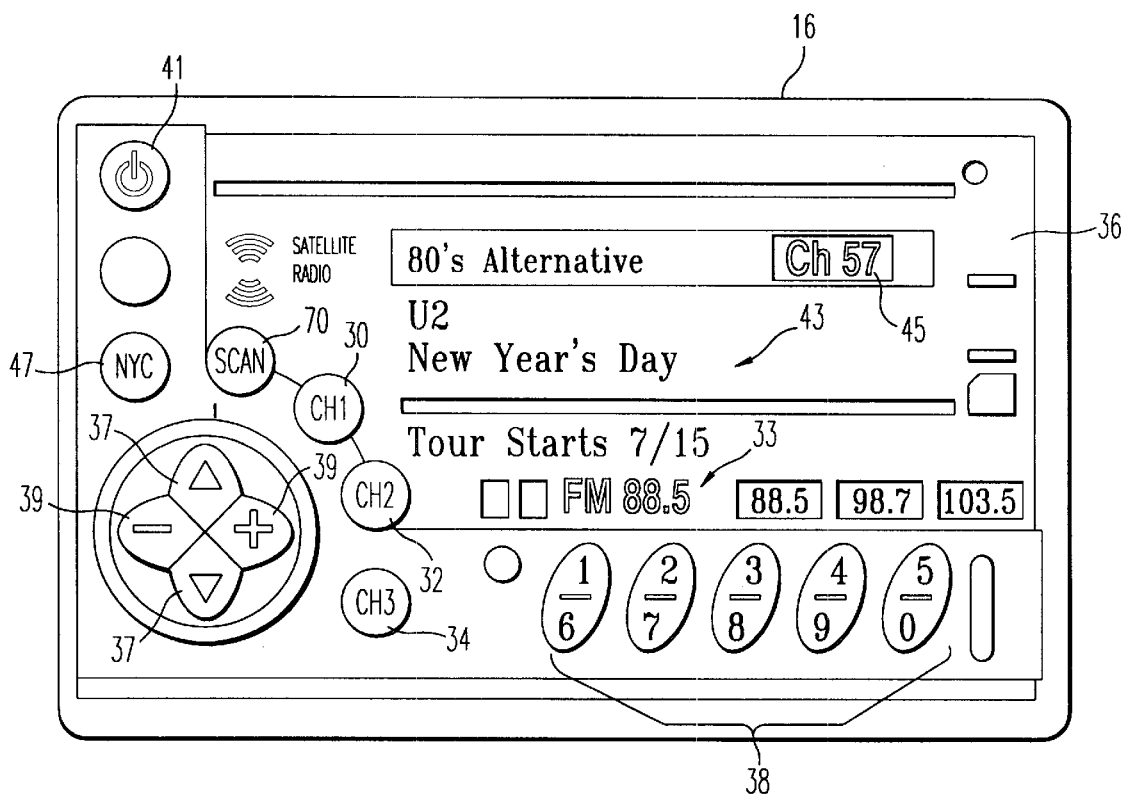
FIG. 8 illustrates an auxiliary audio signal processing and display device constructed in accordance with an embodiment of the present invention.

As shown in FIG. 8, the display 36 can provide additional information other than the radio frequencies of channels from which a user can select for implementing the wireless link 15. The microcontroller can receive data 43 from the satellite receiver relating to SDARS services via an input line 75, as shown in FIG. 3. The SDARS services data 43 can include, for example, satellite broadcast channel number 45, artist name, audio program title and data channel information. The interface device 16 also comprises the power button 41, the scan button 70, the satellite broadcast channel selection buttons 38, as well as volume control and tuning buttons 37 and 39. The microcontroller 60 can indicate via the display 36 the random channel selection of the scanning receiver 58, the signal strength (i.e., RSSI) of satellite or terrestrially repeated SDARS signals, and visual effects (e.g., a dynamic bar graph display corresponding to the output levels of the audio program from the auxiliary audio source), among other displayable information. The display 36 can also indicate the user's current frequency selection 33 for the wireless link 15. In addition, selected open channels in metropolitan areas such as New York City or Los Angeles can be preset on the interface device 16 and selected via a button 47, for example.

The selection of an RF channel for the wireless link 15 will now be described with reference to the flow chart depicted in FIG. 4. As stated previously, the scanning receiver 58 commences scanning an RF spectrum (e.g., the FM radio broadcast band) upon power-up or after the user activates the scan button 70 on the interface device 16 (block 78). The scanning receiver 58 preferably determines a number of RF channels (e.g., between one and three RF channels) to be open and to have sufficiently low noise for use as the wireless link 15 (block 80). If no RF channels can be located, the scanning receiver 58 continues to scan, as indicated by the positive branch of decision block 82. The scanning receiver 58 preferably continuously scans even if suitable RF channels are reported to the microcontroller 60 since conditions may change over time. In accordance with another embodiment of the present invention, the scanning receiver 58 can interrupt scanning if a number of RF channels are located which are suitable for the wireless link 15. The scanning receiver 58 can then resume scanning after the scan button 70 is activated or sound quality on the RF channel selected by the user for the wireless link 15 decreases below a predetermined threshold. In the meantime, only the transmitting antenna 18 is operating, and the receiving antenna 61 is not functional. In this case, the antenna 18 can serve as both a transmitting and receiving antenna with a splitter connection to the RF power amplifier 64 and the scanning receiver 58, respectively, and the antenna 61 can be eliminated. In other words, the antenna 18 is connected to the scanning receiver 58 during the scanning mode and is disconnected from the RF amplifier 64. When a number of RF channels have been located for the wireless link 15, the antenna 18 is used for transmitting on a selected one of the RF channels and scanning through the antenna 18 is interrupted.

Figure 4:
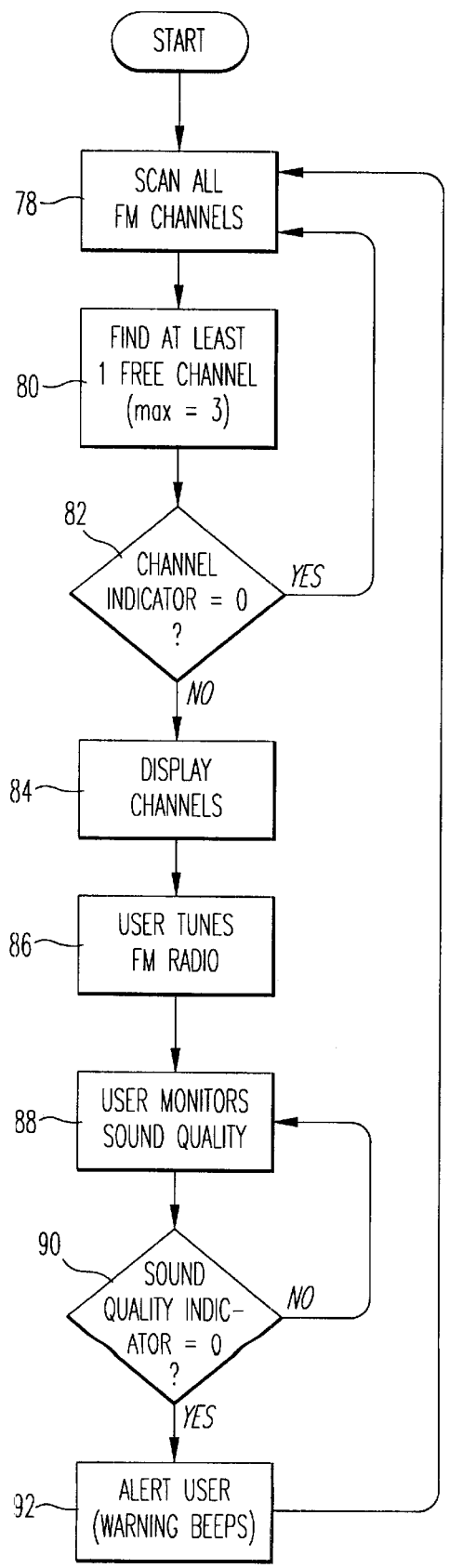
FIG. 4 is a flowchart depicting a sequence of operations for implementing the system in FIG. 1 in accordance with an embodiment of the present invention.

With continued reference to FIG. 4, the microcontroller 60 displays the channels selected by the scanning receiver 58 on the display 36 (block 84). The user selects one of the channels indicated on the display 36 and then tunes the radio receiver 24 to that channel (block 86). The user then commences monitoring the sound quality of the wireless link 15 (block 88). As stated previously, the scanning receiver 58 preferably continuously scans. When the selected RF channel is determined by the scanning receiver to be above a predetermined noise threshold, the scanning receiver 58 provides a signal to the microcontroller 60 to indicate to the user via the display 36 and/or a sound generating device that sound quality is poor blocks 90 and 92). The user can then select another RF channel indicated on the display device 36.

An exemplary satellite receiver 30 is depicted in FIG. 5. The S-band signals received by the antenna 12 of FIGS. 1–3 are amplified by amplifier 96 prior to downconversion to an IF via a mixer 98 and a local oscillator (LO) 100. The recovered IF signal is then processed via an IF filter and amplifier 102 prior to obtaining the digital baseband information transmitted via satellite. For example, the recovered IF signal can be converted to a digital representation thereof using an analog-to-digital converter (ADC) 104 prior to phase shift keying (PSK) demodulation by a demodulator 106 if the baseband signal is PSK-modulated at the broadcast station. The satellite broadcast signals can be time division multiplexed (TDM) signals and may therefore comprise information from a number of broadcast programs, as well as having TDM data representing the left and right stereo channels corresponding to the same broadcast program. Accordingly, a TDM demultiplexer 108 is provided in the satellite receiver 50 to recover the information from the TDM broadcast channels. The recovered information corresponds to the satellite broadcast program selected by the user via the user interface 66, for example, as indicated at 107. The recovered information can be processed at the broadcast stations to provide forward error correction (FEC) coding, which is decoded using an FEC 110 decoder at the receiver 50. Finally, the recovered baseband data can be converted into analog audio signals using an audio decoder 112 such as an MPEG decoder.

In accordance with an aspect of the present invention, the interface device 16 can be implemented to convert the radio receiver 24 into a dual-mode receiver in a satellite broadcast system in which measures such as time and space diversity and terrestrial retransmission have been taken to improve satellite signal reception at the vehicle. Space and time diversity are useful when a mobile satellite receiver is traveling in a suburban or rural area where line of sight blockage with respect to the antenna 12 and the satellite occurs due to bridges, trees and low buildings. On the other hand, terrestrial retransmission of satellite signals is useful in areas where tall buildings are located, such as central city and metropolitan areas.

In FM broadcasting, high audio frequencies are emphasized to improve the signal-to-noise ratio (SNR). Thus, a conventional FM tuner such as the tuner 20 is provided with a de-emphasis circuit for obtaining a flat frequency characteristic. Accordingly, the level of the output signals from the satellite receiver 50 or the CD/cassette player 52 of FIG. 2 are adjusted by the circuit 54 (shown in detail in FIG. 6) to prevent the attenuation of high audio frequencies by the de-emphasis circuit in the tuner 20. Such processing is described in U.S. Pat. No. 5,448,757, issued to Hirata on Sep. 5, 1995, incorporated herein by reference. With reference to FIG. 6, the left and right channels in the audio signals recovered by the satellite receiver are processed by a stereo modulator 116 and an automatic level control (ALC) circuit 118 connected to the output of the pre-emphasis circuit 114. The stereo modulator 116 modulates the audio signals from the satellite receiver 50 to a composite signal. The ALC circuit 118 controls the input to the stereo modulator 116 to reduce distortion.

Although the present invention has been described with reference to a preferred embodiment thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A system for providing audio signals to a radio receiver from an auxiliary audio source comprising:
    an input for receiving said audio signals from said auxiliary audio source;
    a processing device connected to said input and operable to substantially continuously monitor a selected radio frequency spectrum to identify radio frequency channels that satisfy a predetermined open channel criteria, and to automatically select at least one radio frequency satisfying said predetermined open channel criteria at which to transmit said audio signals to said radio receiver via a wireless link, and to modulate said audio signals on said selected radio frequency; and
    an antenna connected to said processing device and operable to transmit said audio signals to said radio receiver using said at least one radio frequency;
    wherein said processing device further comprises an output device for indicating said at least one radio frequency to a user to allow said user to tune said radio receiver to said at least one radio frequency; and
    wherein said auxiliary audio source is a satellite broadcast receiver and said output device also indicates at least one of channel identification data corresponding to a satellite broadcast signal received via said satellite broadcast receiver, satellite broadcast program data comprising at least one of an artist name, a program title, and ancillary data relating to said satellite broadcast program, output level data corresponding to said satellite broadcast receiver, and received signal strength indicator data corresponding to said satellite broadcast signal.

2. A system as claimed in claim 1, wherein said at least one radio frequency is selected from one of an amplitude modulation radio broadcast spectrum and a frequency modulation radio broadcast spectrum.

3. A system as claimed in claim 1, wherein said processing device is operable to monitor the quality of said at least one radio frequency, to select another radio frequency when said at least one radio frequency degrades, and to generate a second indication signal to instruct said user to tune said radio receiver to said another radio frequency.

4. A system as claimed in claim 1, wherein said processing device is operable to randomly select a first radio frequency which satisfies said predetermined open channel criteria from said selected radio frequency spectrum in response to powering up of said processing device.

5. A system as claimed in claim 1, wherein said processing device comprises a scanning receiver for automatically scanning said predetermined radio frequency spectrum and selecting a radio frequency therein for said wireless link.

6. A system as claimed in claim 1, wherein said processing device is operable to automatically and dynamically identify a plurality of radio frequencies satisfying said predetermined open channel criteria at which to transmit said audio signals to said radio receiver.

7. A system as claimed in claim 6, wherein said processing device is operable to display said plurality of radio frequencies via said output device, and further comprises a selection device to allow a user to select one of said plurality of radio frequencies, said processing device modulating said audio signals using the radio frequency selected via said selection device.

8. A system as claimed in claim 7, wherein said processing device is operable to monitor the quality of the radio frequency selected via said selection device, and to generate a signal to instruct said user to select another of said plurality of radio frequencies when the radio frequency selected via said selection device degrades.

9. A system as claimed in claim 1, wherein said radio receiver comprises a de-emphasis circuit, said processing device comprising a pre-emphasis circuit for reducing the effect of said de-emphasis circuit on said audio signals transmitted to said radio receiver.

* * * * *